United States Patent [19]
Klugman

[11] 3,772,858
[45] Nov. 20, 1973

[54] FUME WASHER HOUSING
[75] Inventor: Warren L. Klugman, Cuyahoga, Ohio
[73] Assignee: The Ceilcote Company, Inc., Berea, Ohio
[22] Filed: Apr. 23, 1971
[21] Appl. No.: 136,842

[52] U.S. Cl............. 55/503, 55/233, 55/504, 55/510, 55/516
[51] Int. Cl............................................. B01d 47/06
[58] Field of Search............... 55/84, 85, 89, 93–95, 55/220, 227, 228, 233, 259, 478–481, 495, 502, 503, 504, 510, 511, 516, 512, 518; 220/88 A, 4 E, 4 R; 261/97, 98, 100, 116; 210/446, 448, 477, ; 285/183, 184, 150

[56] References Cited
UNITED STATES PATENTS
| | | | |
|---|---|---|---|
| 1,703,440 | 2/1929 | Duke | 210/445 |
| 2,163,600 | 6/1939 | How | 55/480 |
| 3,006,436 | 10/1961 | Starbuck et al. | 55/512 |
| 3,406,498 | 10/1968 | Wisting | 261/117 |
| 3,596,440 | 8/1971 | Nutter | 55/475 |
| 3,693,410 | 9/1972 | Robrecht et al. | 55/511 |

FOREIGN PATENTS OR APPLICATIONS
1,199,021   7/1970   Great Britain ..................... 55/495

Primary Examiner—Bernard Nozick
Attorney—Meyer, Tilberry & Body,

[57] ABSTRACT

A fume washer comprises a hollow body formed of synthetic plastic material. The fume washer is initially rotomolded in one-piece which is then cut into first and second structural members. One structural member has an outlet which may be positioned either horizontally or vertically. Demister padding is supported between grids within the hollow body. A water spray wets the demister padding while fumes are blown through the demister padding to remove pollutants from the fumes.

13 Claims, 21 Drawing Figures

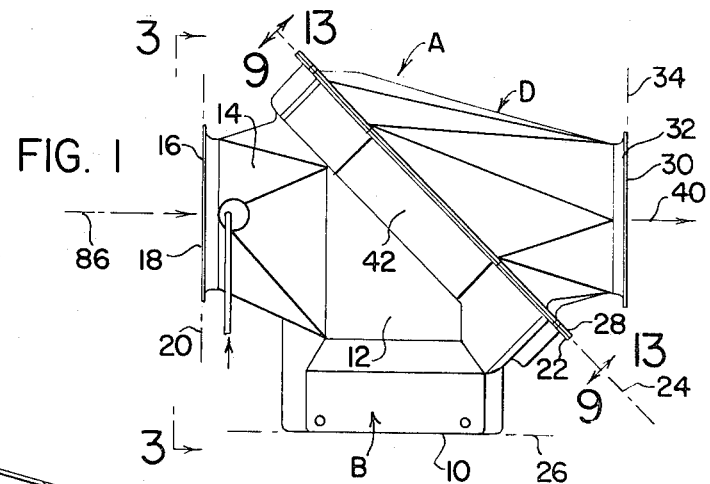

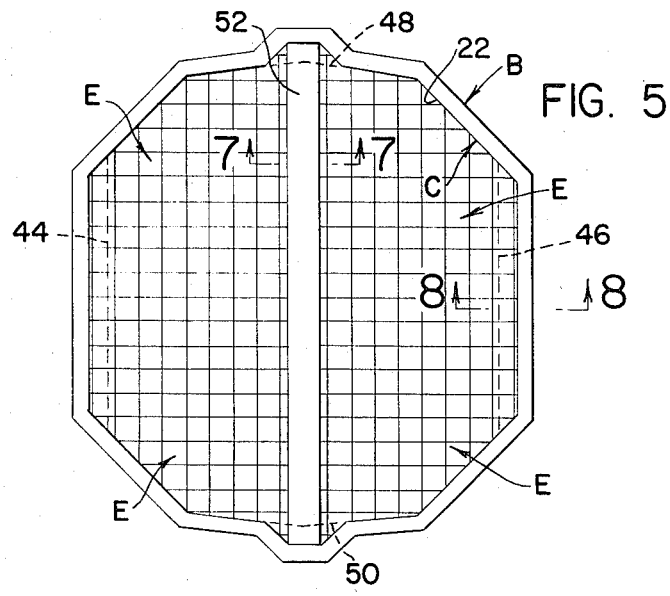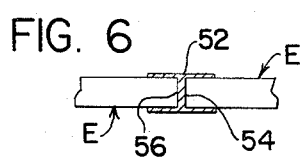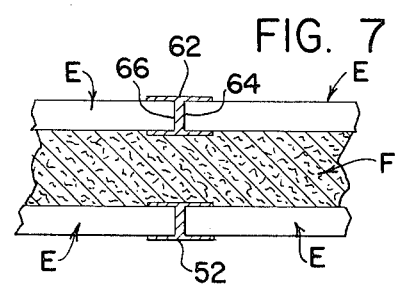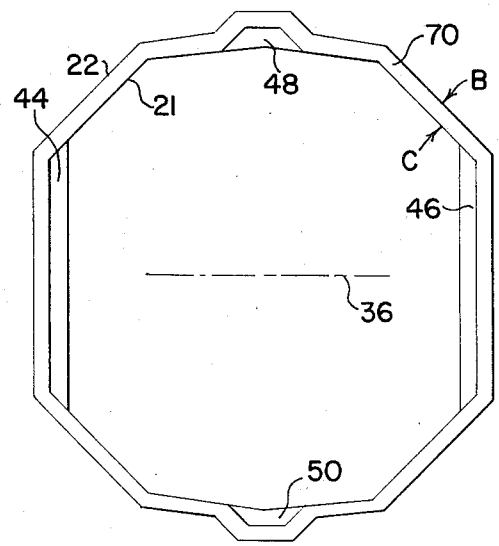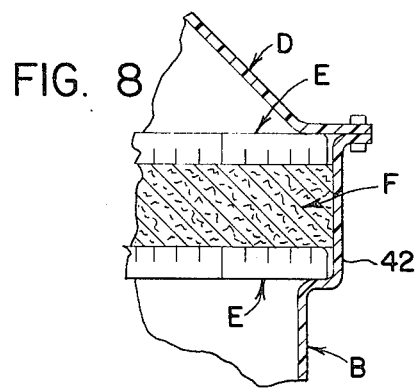

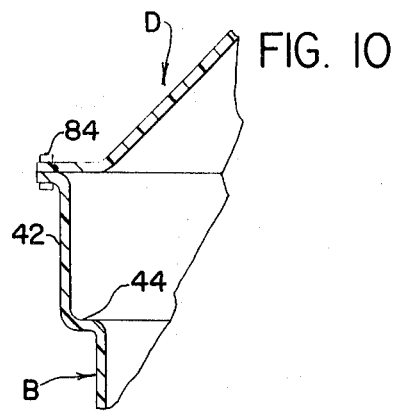
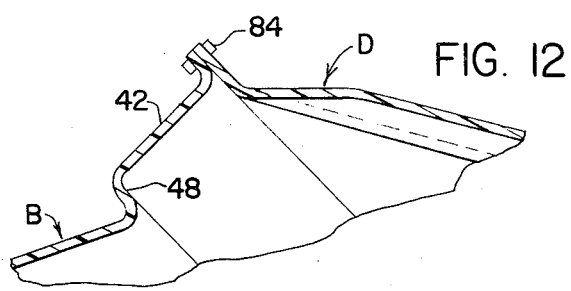
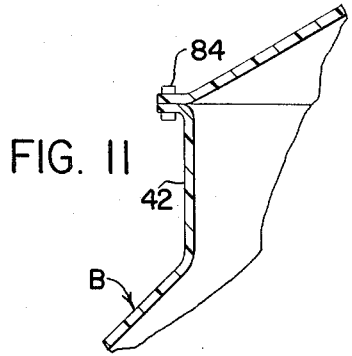
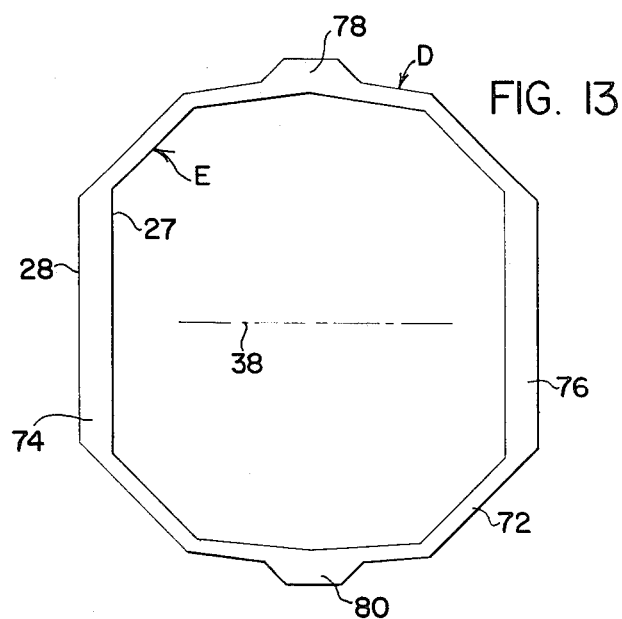
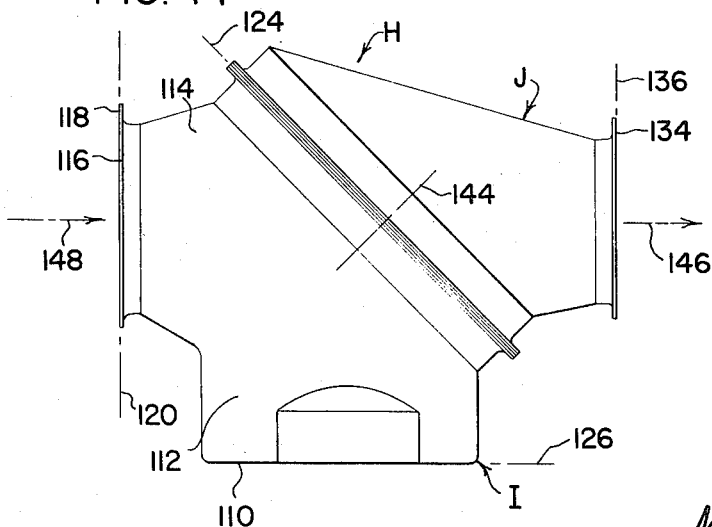
*INVENTOR.*
WARREN L. KLUGMAN
BY
*Meyer, Tilberry & Body*
ATTORNEYS INVENTOR.
WARREN L. KLUGMAN
BY
*Meyer, Tilberry & Body*
ATTORNEYS INVENTOR.
WARREN L. KLUGMAN
BY
Meyer, Tilberry & Body
ATTORNEYS

FUME WASHER HOUSING

BACKGROUND OF THE INVENTION

This application pertains to the art of air pollution control and more particularly to liquid-gas contact apparatus for removing pollutants from air. The invention is particularly applicable to liquid-gas contact apparatus for washing fumes and will be described with particular reference thereto although it will be appreciated that the invention has broader applications and may be used in other environments.

Air pollutants commonly occurring in industrial areas include the following: noxious gases which normally exist in a vapor state such as chlorine or sulfur dioxide; liquid entrainment such as large size liquid particles created by sprays or bubbling; mists in the form of liquid particles resulting from condensation of molecules from the vapor state such as sulfuric acid vapor condensing to sulfuric acid mist; dusts of solid particles formed by grinding or disintegration of solid materials; fumes of solid particles formed by condensation, sublimation, or oxidation of metallic vapors such as zinc oxide fumes; and entrained particles of mists, liquids, dusts or fumes which are conveyed in an air stream through an exhaust ventilation system. Pollutants of the type described are commonly removed from an air stream through a liquid-gas contact apparatus. Apparatus of this type is often referred to as an air scrubber or a fume washer. Such apparatus includes a large receptacle containing demister padding or packing. Water is sprayed onto the demister padding or packing while the polluted air stream is blown through the demister padding or packing. Pollutants of the type described are absorbed or diffused into the liquid as the polluted air stream passes through and around the demister padding or packing which is wetted by the liquid.

SUMMARY OF THE INVENTION

The liquid-gas contact apparatus of the present invention is intended primarily as a fume washer for removing entrained liquid particles from exhaust air streams although it will be appreciated that it may be used for removing other pollutants of the type previously described. The improved fume washer of the present invention is particularly advantageous for use in the metal finishing industry where high efficiency entrainment separation is necessary.

The improved fume washer of the present invention is preferably rotomolded in one-piece of synthetic plastic material to form a hollow body. Rotomolding the hollow body of synthetic plastic material provides an extremely smooth interior surface which offers a minimum of air resistance. After being rotomolded in one-piece, the hollow body is trimmed and cut into first and second structural members.

The first structural member has a substantially horizontal base bottom wall and an upwardly extending peripheral wall. A substantially horizontal duct extends outwardly from the peripheral wall above the base bottom wall on one side of the first structural member. The horizontal duct on the first structural member terminates in an inlet opening having a peripheral edge which lies in a substantially vertical first plane. The first structural member also includes an enlarged opening located opposite the duct and inlet opening. This enlarged opening has a peripheral edge which lies in a second phase extending at substantially 45° to the vertical first plane and to the base bottom wall.

The second structural member includes a second duct having an enlarged opening substantially symmetrical with respect to the enlarged opening on the first structural member. The enlarged opening on the second structural member has a peripheral edge secured to the peripheral edge of the enlarged opening on the first structural member. The second structural member includes an outlet opening having a peripheral edge lying in a third plane which extends at substantially 45° with respect to the second plane. The second structural member may be connected to the first structural member with the axis of the outlet opening extending either horizontally or vertically.

In accordance with a preferred arrangement, at least one of the first or second structural members is provided with a pocket adjacent the enlarged opening therein for receiving demister padding and support grids for the demister padding.

In accordance with another arrangement, the first and second structural members have polygonal surfaces which make the structural members more rigid and resistant to deformation.

In accordance with another aspect of the invention, a grid member for supporting demister padding includes a plurality of spaced-apart ribs which extend horizontally when positioned in the fume washer. The ribs are elongated in a direction perpendicular to the plane of the enlarged openings on the first and second structural members and act as turning vanes to uniformly distribute the air stream throughout the demister padding.

It is a principal object of the present invention to provide an improved liquid-gas contact apparatus which is more economical to manufacture and install than previous arrangements.

It is also an object of the present invention to provide a liquid-gas contact apparatus which is very efficient in operation.

It is a further object of the present invention to provide an improved liquid-gas contact apparatus which can be installed with vertical or horizontal outlet air flow.

It is also an object of the present invention to provide an improved grid member for use in a liquid-gas contact apparatus.

It is an additional object of the present invention to provide an improved liquid-gas contact apparatus having a grid member for supporting demister padding and arranged to uniformly distribute the air stream throughout the demister padding.

BRIEF DESCRIPTION OF THE DRAWING

The invention may take physical form in certain parts and arrangements of parts, preferred embodiments of which will be described in detail in this specification and illustrated in the accompanying drawings which form a part hereof.

FIG. 1 is a side elevational view of a fume washer constructed in accordance with the present invention;

FIG. 2 is a side elevational cross-sectional view of a fume washer constructed in accordance with the present invention;

FIG. 3 is an end elevational view looking in the direction of arrows 3—3 of FIG. 1;

FIG. 4 is a plan view looking in the direction

FIG. 5 is a cross-sectional view looking in the direction of arrows 5—5 of FIG. 2;

FIG. 6 is a cross-sectional view looking in the direction of arrows 6—6 of FIG. 2;

FIG. 7 is a cross-sectional view looking in the direction of arrows 7—7 of FIG. 5;

FIG. 8 is a cross-sectional view looking in the direction of arrows 8—8 of FIG. 5;

FIG. 9 is a cross-sectional view looking in the direction of arrows 9—9 of FIG. 1;

FIG. 10 is a cross-sectional view looking in the direction of arrows 10—10 of FIG. 4;

FIG. 11 is a cross-sectional view looking in the direction of arrows 11—11 of FIG. 4;

FIG. 12 is a cross-sectional view looking in the direction of arrows 12—12 of FIG. 4;

FIG. 13 is a cross-sectional view looking in the direction of arrows 13—13 of FIG. 1;

FIG. 14 is a side elevational view of another form of a fume washer constructed in accordance with the present invention;

DESCRIPTION OF THE PREFERRED EMBODIMENT

Figure 15:
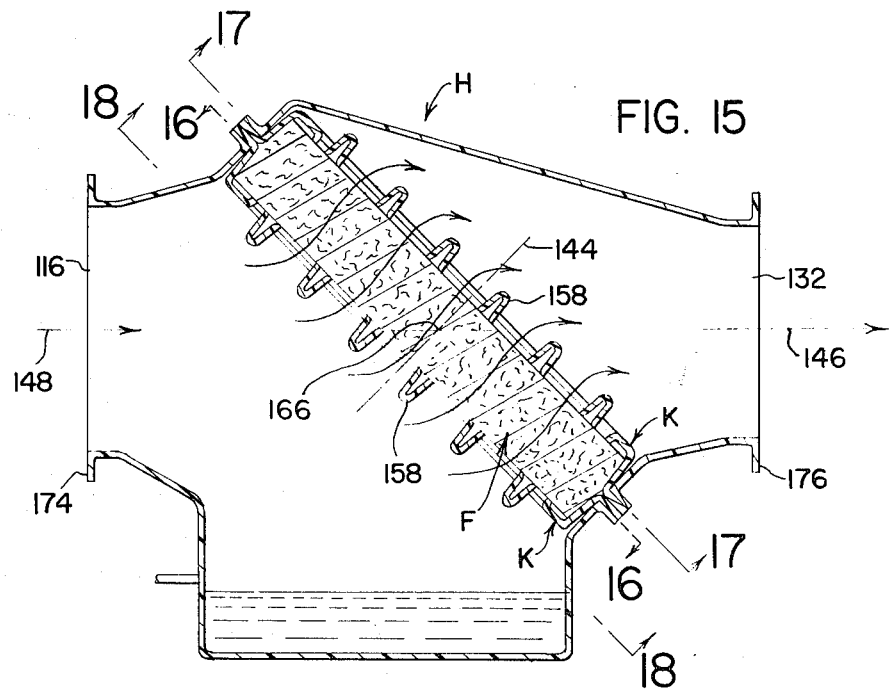
FIG. 15 is a side elevational cross-sectional view of the fume washer of FIG. 14.
Figure 16:
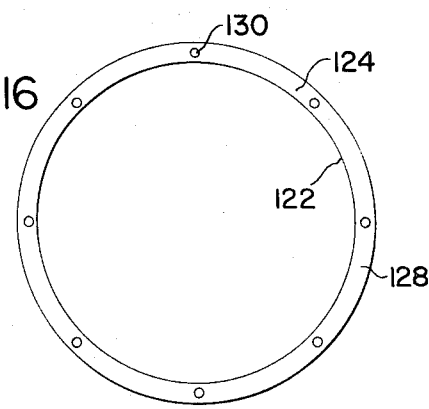
FIG. 16 is a cross-sectional view looking in the direction of arrows 16—16 of FIG. 15.
Figure 17:
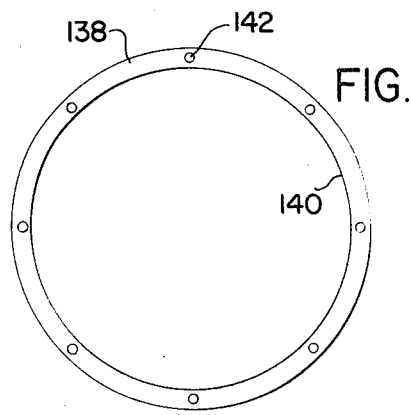
FIG. 17 is a cross-sectional view looking in the direction of arrows 17—17 of FIG. 15.
Figure 18:
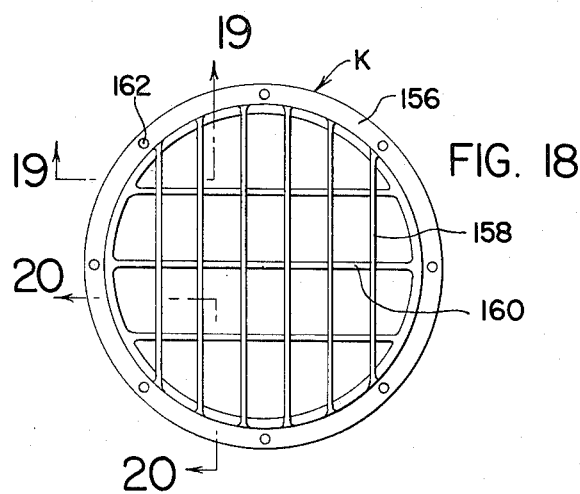
FIG. 18 is a plan view of a grid member used with the fume washer of FIG. 15 and looking in the direction of arrows 18—18 of FIG. 15.

Referring now to the drawings, wherein the showings are for purposes of illustrating preferred embodiments of the invention only and not for purposes of limiting same, FIG. 1 shows an improved fume washer A constructed in accordance with the present invention. Fume washer A is constructed of synthetic plastic material such as ABS which is a combination of acrylonitrile, butadiene and styrene. Fume washer A may also be constructed of polyethylene or any other synthetic plastic material capable of being rotomolded, and having sufficient rigidity and corrosion resistance for use in a fume washing environment.

Fume washer A is in the form of a hollow body which includes a hollow base portion B defining a first structural member having a substantially horizontal base bottom wall 10 and an upwardly extending peripheral wall 12. A substantially horizontal duct 14 extends outwardly from peripheral wall 12 above base bottom wall 10 on one side of base portion B. Horizontal duct 14 terminates in an inlet opening 16 having a peripheral edge 18 lying in a substantially vertical first plane 20. As best shown in FIG. 9, base portion D includes an enlarged opening C located opposite duct 14 and opening 16. Enlarged opening C has inner and outer peripheral edges 21 and 22 lying in a second plane 24 which extends at substantially 45° to vertical first plane 20, and to horizontal plane 26 in which base portion 10 lies.

The hollow body defining fume washer A further includes a second duct member D defining a second structural member having an enlarged opening E, as best shown in FIG. 13, which is substantially symmetrical with respect to enlarged opening C on base portion B. Enlarged opening E on second structural member D has inner and outer peripheral edges 27 and 28 which are secured in facing relationship to peripheral edges 21 and 22 of enlarged opening C on first structural member B. Peripheral edges 27 and 28 of enlarged opening E on second structural member D also lie substantially in plane 24. Second structural member D includes an outlet opening 30 having a peripheral edge 32 lying in a third plane 34 which extends at substantially 45° with respect to second plane 24. As shown in FIG. 9, enlarged opening C on base portion B is symmetrical on opposite sides of a transverse line 36. As shown in FIG. 13, enlarged opening E is also symmetrical on opposite sides of a transverse line 38. Peripheral edges 22 and 28 of enlarged openings C and E are also of substantially the same size and shape. With such an arrangement, duct member D may be positioned with its longitudinal axis 40 extending either horizontally as shown in FIG. 1, or extending vertically simply by rotating duct member D 180°. In either position, where longitudinal axis 40 of opening 30 extends either horizontally or vertically, plane 34 extends at substantially 45 degrees to plane 24.

In accordance with a preferred arrangement, at least one of first and second structural members B and D includes a pocket duct. In the arrangement shown and described, base portion B has the product duct which includes a peripheral duct wall 42 having a substantially uniform cross-sectional area and shape throughout its length. Peripheral edge 21 of enlarged opening C on base portion B defines one end edge of the pocket duct, while the other end of the pocket duct has supporting shoulders 44, 46, 48 and 50 projecting substantially radially inward therefrom. With this arrangement, an I-beam member 52 may be positioned with its ends supported on shoulders 48 and 50 within the pocket duct. A plurality of supporting grid members E, four of which are shown in FIG. 5, may have one edge thereof received in opposite channels 54 and 56 of I-beam 52. A portion of the opposite edges of grid members E are supported on shoulders 44 and 46. Demister padding material F, such as open mesh fabric of synthetic plastic material, may then be positioned on grid members E. A second I-beam 62 may then be positioned on top of demister padding F in alignment with I-beam 52. Additional grid members E may then be added and have their edges supported within channel portions 64 and 66 of I-beam 62. Demister padding material E is then effectively trapped between substantially rigid grid members E, and I-beam 52 and 62.

Base portion B has a peripheral flange 70 extending outwardly from enlarged opening C. Peripheral flange 70 is of substantially the same width all around opening C. Second structural member D has a peripheral flange 72 extending outwardly from enlarged opening E. Peripheral flange 72 includes opposite side portions 74 and 76 which are wider than other portions of peripheral flange 72 and also wider than peripheral flange 70. Peripheral flange 72 also has opposite peripheral portions 78 and 80 which are wider than the remainder of peripheral flange 72 and also wider than peripheral flange 70. The width of peripheral flanges 74 and 76 is substantially the same as the width of peripheral flange 70 added to the width of either shoulder 44 or 46. The width of peripheral flange portions 78 and 80 is substantially the same as the width of peripheral flange 70 plus the width of either shoulder 48 or 50. With second structural member D assembled to base portion B, side peripheral portions 74 and 76 clamp against the outer upper surface portions of grid members E. Wider peripheral portions 78 and 80 clamp against the upper end surface portions of upper I-beam 62. This arrangement securely clamps the assembled grid members, I-beams and demister padding within the pocket duct. With longitudinal axis 40 of outlet opening 30 extending horizontal as shown in FIG. 1, side peripheral flange 76 of second structural member D will overlie shoulder 46 of base portion B. With second structural member D reversely positioned so that longitudinal axis 40 of outlet opening 30 extends vertical, wide peripheral flange portion 74 of second structural member D will overlie shoulder 44, while wide peripheral flange portion 76 will overlie shoulder 46. The sectional views shown in FIGS. 9–13 are shown without the channel members, grid members and demister padding in position within the pocket duct for clarity of illustration. Suitable holes may be provided through peripheral flanges 70 and 72 for receiving bolts 84 to tightly clamp peripheral flanges 70 and 72 together. Suitable gasketing material may be placed between flanges 70 and 72 prior to securement thereof together if so desired. With a bolting arrangement, or other releasable fastener means, first and second structural members B and D may be taken apart after fume washer A has been used to replace demister padding F or to clean the interior of fume washer A.

In accordance with the preferred arrangement, base portion B and second duct member D are constructed in such a manner that when they are assembled as shown in FIG. 1 longitudinal axis 40 of outlet opening 30 will be substantially coincidental with longitudinal axis 86 of inlet opening 16. This arrangement achieves a very efficient air flow through fume washer A. Outlet opening 30 may be connected to the inlet of a centrifugal fan while inlet opening 16 is connected to the source of fumes. Operation of the centrifugal fan will draw air through inlet opening 16 and out outlet opening 30 in the direction indicated by the arrows. With duct member D reversely positioned relative to base portion B so that plane 34 extends horizontal, longitudinal central axis 40 of outlet opening 30 will extend perpendicular to longitudinal central axis 86 of inlet opening 16. In addition, enlarged openings C and E have a central longitudinal axis 88 as shown in FIG. 2. Longitudinal axes 40 and 86 are coincidental with one another and intersect axis 88 at a point 90 which is substantially the midpoint of the pocket duct and the midpoint of demister padding F as measured between I-beams 52 and 62. With duct member D reversely positioned so that longitudinal central axis 40 of outlet opening 30 extends vertical, axis 40 will be perpendicular to axis 86 and will also intersect axis 86 at point 90.

In the arrangement shown in FIGS. 1–13, it will be recognized from the drawing that the outer surfaces of base portion B and duct member D are somewhat polygonal in shape. That is, the outer surfaces are defined by a plurality of reversely positioned triangles of various sizes and shapes. The peripheral surfaces of ducts 14 and D are substantially polygonal, while inlet and outlet openings 16 and 30 are substantially circular. At the same time, enlarged openings C and E are polygonal. Formation of inlet and outletopenings 16 and 30 circular makes it easier to connect fume washer A to circular ducts during installation. The polygonal nature of the remaining surfaces of fume washer A reinforces the fume washer against deformation. forming enlarged openings C and D polygonal makes it possible to utilize somewhat rectangular grid members which are easily trimmed along straight lines to fit within the pocket duct.

Peripheral wall 12 of base portion B includes a drain opening 92 located on the same side of base portion B as horizontal duct 14 and adjacent base bottom wall 10. Peripheral wall 12 further includes an overflow opening 94 located on the same side of base portion B as horizontal duct 14 and positioned intermediate horizontal duct 14 and base bottom wall 10 above drain opening 92. Another opening 96 in peripheral wall 12 is connected with suitable conduit 102 and pump 104 for recirculating water through spray nozzle means G which is directed against grid members E and demister padding F as diagrammatically shown in FIG. 2. Spray nozzle means G is arranged to spray water over the entire surface of grid members E and demister padding F. Water drains back down into the bottom of base portion B after having absorbed pollutants from the air stream flowing through fume washer A.

In accordance with another arrangement, the fume washer may have somewhat circular and smooth outer surfaces rather than being polygonal. An arrangement of this type is shown in FIG. 14 wherein fume washer H includes a base portion I defining a first structural member and a second duct member J defining a second structural member. Base portion I includes a substantially horizontal bottom wall 110 and a peripheral wall portion 112. A horizontal duct 114 extends outwardly from peripheral wall 122 and has an inlet opening 116 which includes a peripheral edge 118 lying in a vertical plane 120. Base portion I has an enlarged opening 122 located opposite bottom wall 110 and opening 116. Enlarged opening 122 lies in a plane 124 which extends at 45° to vertical plane 120 and to plane 126 in which bottom wall 110 lies. Base portion I has an outwardly extending peripheral flange 128 adjacent enlarged opening 122. Suitable holes as at 130 may be provided in peripheral flange 128. Second structural member J includes an outlet opening 132 having a peripheral edge 134 lying in a plane 136 which extends at 45° to plane 124. Second structural member J has a peripheral wall 138 extending outwardly from enlarged opening 140. Suitable holes 142 may also be formed in peripheral flange 138. Enlarged openings 122 and 140 are of substantially the same size and shape. With the arrangement described, it will be recognized that second structural member J may be rotated about central axis 144 of enlarged openings 122 and 140 so that central longitudinal axis 146 of outlet opening 132 will extend vertically rather than horizontally. Longitudinal axis 146 of outlet opening 132 is preferably coincidental with longitudinal axis 148 of inlet opening 116 when axis 146 is horizontal. Openings 116, 132, 122 and 140 are all circular.

Figure 19:
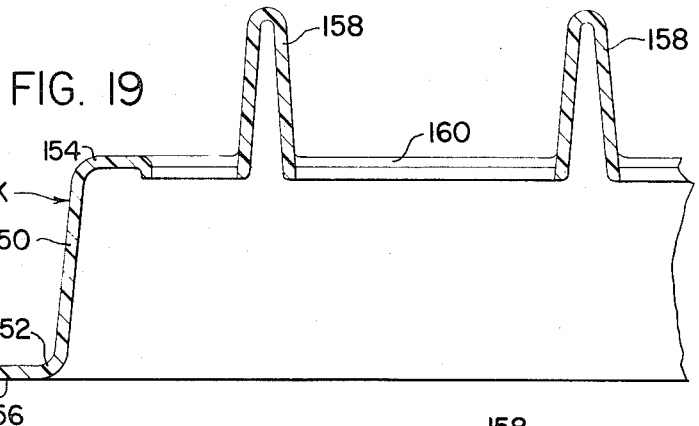
FIG. 19 is a cross-sectional view looking in the direction of arrows 19—19 of FIG. 18.
Figure 20:
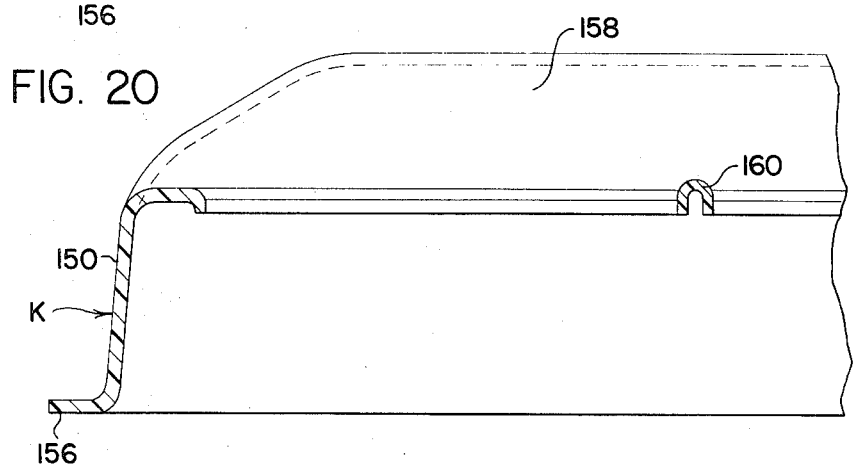
FIG. 20 is a cross-sectional view looking in the direction of arrows 20—20 of FIG. 18.

In accordance with a preferred arrangement, a novel grid member is used with the embodiment of FIG. 14 for supporting demister padding material. Grid member K includes a circular peripheral wall 150 having first and second peripheral edges 152 and 154 respectively. A peripheral flange 156 extends radially outward from first peripheral edge 152. A grid wall extends completely across second peripheral edge 154. The grid wall includes a plurality of spaced-apart parallel ribs 158. A plurality of spaced-apart parallel tie bars 160 extend perpendicular to ribs 158 and interconnect ribs 158. As shown in FIG. 19, ribs 158 have a substantially V-shaped cross-sectional shape. Ribs 158 preferably have a height which is at least five times the height of tie bars 160. A plurality of holes 162 are provided in peripheral flange 156. The diameter of the outer peripheral edge of flange 156 is preferably substantially the same as the outer diameter of peripheral flanges 128 and 138. A pair of dish-shaped grid members K are reversely positioned with demister padding F therebetween as shown in FIG. 15. Flanges 156 of the pair of grid members K are positioned between flanges 128 and 138. Suitable bolts may then be passed through holes 130, 142 and 162 for releasably connecting second structural member J to base portion I with grid members K and demister padding F trapped therebetween. In the preferred arrangement, grid members K are positioned with ribs 158 extending horizontally as shown in FIG. 14 so that ribs 158 act as turning vanes which uniformly distribute the air flow through demister padding F. Outlet opening 132 may be connected to the inlet of a centrifugal blower for drawing polluted air through fume washer H. Air flowing into inlet opening 116 strikes ribs 158 to force the air uniformly through demister padding F. Grid members K are preferably molded in one-piece of synthetic plastic material.

Central longitudinal axis 144 of enlarged openings 122 and 140 intersects midpoint 166 of demister padding F. In the preferred arrangement, central longitudinal axis 146 of outlet opening 132 is coincidental with central longitudinal axis 148 of inlet opening 116 and also passes substantially through midpoint 166. With central longitudinal axis 146 positioned vertically so as to be perpendicular to central longitudinal axis 148, axes 146 and 148 intersect substantially at point 166. The arrangement shown and described produces highly efficient air flow and highly efficient removal of pollutants from the air stream flowing through fume washer H.

In a preferred arrangement, inlet and outlet openings 16 and 30 of fume washer A have radially outward extending peripheral flanges 170 and 172 for readily connecting other ducts to fume washer A. Likewise, inlet and outlet openings 116 and 132 of fume washer H have radially outward extending peripheral flanges 174 and 176 for easily connecting other ducting thereto.

Figure 21:
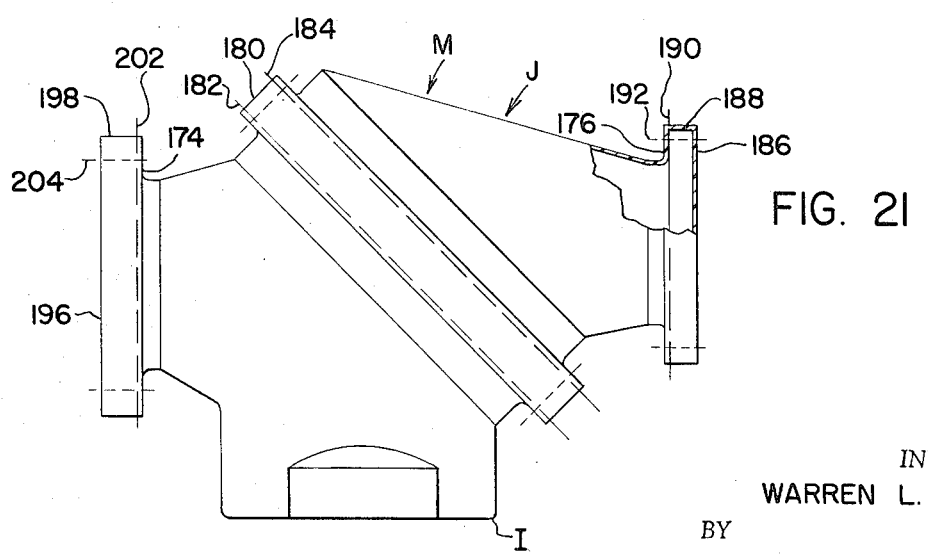
FIG. 21 is a side elevational view of the improved fume washer body of the present invention immediately after it has been rotomolded in one-piece and prior to being trimmed.

In the preferred arrangement, both fume washers A and H are rotomolded in one-piece of synthetic plastic material as shown in FIG. 21. The one-piece hollow body shown in FIG. 21 represents fume washer H and those skilled in the art will be aware that fume washer A may be constructed in the same manner. A one-piece hollow body M is rotomolded to the shape shown in FIG. 21. Hollow body M includes a cylindrical portion 180 which is cut through circumferentially along lines 182 and 184 to separate hollow body M into first and second structural members I and J. Hollow body M also includes a closed end wall 186 and a cylindrical wall 188. Cylindrical wall 188 is cut through circumferentially along line 190 so that end wall 186 and cylindrical wall 188 may be removed. This then defines outlet opening 132 of fume washer H. An additional circumferential cut may be made along line 192 for trimming purposes to form flange 176. Hollow body M includes another end wall 196 and a cylindrical wall 198. Cylindrical wall 198 may be circumferentially cut along line 202 so that end wall 196 and cylindrical wall 198 may be removed to define inlet opening 116 of fume washer H. An additional circumferential trimming cut may be made along line 204 to define flange 174 of fume washer H.

While the invention has been described with reference to certain preferred embodiments, it is obvious that alterations and modifications will occur to others skilled in the art upon the reading and understanding of this specification. The present invention includes all such equivalent alterations and modifications and is limited only by the scope of the claims.

I claim:

1. A housing for a fume washer comprising; a hollow body of synthetic plastic material; said body including a hollow base portion defining a first structural member having a substantially horizontal base bottom wall and an upwardly extending peripheral wall, a substantially horizontal duct extending outwardly from said peripheral wall above said base bottom wall on one side of said base portion, said horizontal duct terminating in an inlet opening having a peripheral edge lying in a substantially vertical first plane, said base portion including an enlarged opening opposite said duct and inlet opening, said enlarged opening having a peripheral edge lying in a second plane extending at substantially 45° to said vertical first plane and to said base bottom wall, said body including a second duct member defining a second structural member having an enlarged opening substantially symmetrical with respect to said enlarged opening on said base portion, said enlarged opening on said second duct member having a peripheral edge lying substantially in said second plane, said peripheral edge of said enlarged opening of said second duct member being rotatable relative to said peripheral edge of said enlarged opening of said base portion about an axis perpendicular to said second plane, said second duct member including an outlet opening having a peripheral edge lying in a third plane extending at substantially 45° with respect to said second plane, and said peripheral edge of said enlarged opening of said second duct member being detachably connected to said peripheral edge of said enlarged opening of said base portion, whereby said second duct member can be selectively positioned relative to said base portion in a first position in which said third plane is parallel to said first plane and in a second position in which said third plane is perpendicular to said first plane.

2. The device of claim 1 wherein said inlet opening has a central axis and said outlet opening has a central axis, said central axes being substantially coincidental when said second duct member is in said first position.

3. The device of claim 1 wherein said enlarged openings in said first and second structural members are polygonal and said inlet and outlet openings are circular.

4. The device of claim 1 and further including overflow and drain openings formed in said peripheral wall of said base portion, said drain opening being positioned adjacent said base bottom wall and said overflow opening being positioned intermediate said horizontal duct and said base bottom wall.

5. The device of claim 1 comprising grid member having a circular peripheral wall having first and second peripheral edges, flange means extending substantially radially outward from said first peripheral edge, a grid wall extending across said second peripheral edge, said grid wall including a plurality of spaced-apart parallel ribs and a plurality of spaced-apart parallel tie bars extending perpendicular to said ribs and interconnecting said ribs, said ribs having a substantially V-shaped cross-sectional shape and having a height at least five times the height of said tie bars.

6. The device of claim 1 wherein at least one of the corresponding structural members includes a pocket duct adjacent said enlarged opening, said pocket duct including a peripheral duct wall having a substantially uniform cross-sectional area and shape throughout its length.

7. The device of claim 6 wherein said pocket duct is formed only in said base portion, said peripheral edge of said enlarged opening on said base portion defining one end edge of said pocket duct, the other end of said pocket duct having a supporting shoulder projecting substantially radially inward therefrom.

8. The device of claim 6 wherein said pocket is formed in both said base portion and said second duct member.

9. The device of claim 6 wherein said peripheral pocket duct wall has a midpoint and said enlarged openings have a central axis, said inlet and outlet openings have central axes substantially coincidental with one another and intersecting said central axis of said enlarged opening substantially at said midpoint of said pocket duct wall when said second duct member is in said first position.

10. The device of claim 1 and further including spaced-apart structural supporting grid means positioned in said body members adjacent said enlarged openings, and demister pad means positioned between said grid means.

11. The device of claim 10 wherein said peripheral edges of said enlarged openings have flange means extending substantially radially outward therefrom, said grid means including a pair of dished-shaped reversely positioned grid members having outwardly extending flanges contacting one another and being positioned between said flange means extending substantially radially outward from said peripheral edges of said enlarged openings.

12. The device of claim 11 wherein said supporting grid members comprise a peripheral wall and a grid wall, said grid wall including a plurality of spaced-apart parallel ribs, said ribs being connected by a plurality of spaced-apart parallel tie bars extending substantially perpendicular to said ribs, said ribs projecting outwardly from said grid wall.

13. The device of claim 12 wherein said grid members are positioned with said ribs extending substantially horizontal.

* * * * *